United States Patent [19]

Mahlein

[11] Patent Number: 4,553,822
[45] Date of Patent: Nov. 19, 1985

[54] OPTICAL POLARIZER HAVING A DIELECTRIC MULTIPLE LAYER SYSTEM

[75] Inventor: Hans Mahlein, Unterhaching, Fed. Rep. of Germany

[73] Assignee: Siemens Aktiengesellschaft, Berlin & Munich, Fed. Rep. of Germany

[21] Appl. No.: 400,955

[22] Filed: Jul. 22, 1982

[30] Foreign Application Priority Data

Sep. 21, 1981 [DE] Fed. Rep. of Germany ....... 3137442

[51] Int. Cl.$^4$ .................... G02F 1/09; G02B 5/30
[52] U.S. Cl. ...................... 350/377; 350/394
[58] Field of Search ................ 350/394–395, 350/171, 173, 353, 355, 165, 356, 359, 377; 372/106, 108

[56] References Cited

U.S. PATENT DOCUMENTS

| 2,403,731 | 7/1946 | MacNeille | 350/394 |
| 3,508,164 | 4/1970 | Uchida | 372/108 |
| 3,612,652 | 10/1971 | Habegger | 350/394 |
| 4,017,153 | 4/1977 | Sardos | 350/394 |
| 4,272,159 | 6/1981 | Matsumoto | 350/375 |

FOREIGN PATENT DOCUMENTS 1220972  1/1971  United Kingdom ............. 350/171

OTHER PUBLICATIONS

Pridatko et al., Optiko-Mekhancheskaia Promyshlennost, 1958, pp. 23–26.
Grischkowsky, D. R., "Low-Loss, Double-Pass System for Laser Amplifiers", IBM Tech. Disc. Bull., 4-1972, pp. 3485–3486.
Sokolova et al., "Interference Polarizers for the Ultraviolet Spectral Region", Optics & Spectroscopy, 1963, pp. 213–215.
Clapham et al., "Some Applications of Thin Films to Polarization Devices", App. Optics, 10-1969, pp. 1965–1974.
M. Banning, "Practical Methods of Making and Using Multilayer Filters", *Journal of the Optical Society of America*, vol. 37, No. 10, Oct. 1947, pp. 792–797.
H. A. Macleod, "Thin Film Optical Filters", Adam Hilger Ltd., London, 1969, pp. 301–304.
H. F. Mahlein et al., *Optik*, vol. 38, No. 2, 1973, pp. 187–195.
K. Kobayashi et al., "Microoptic Grating Multiplexers and Optical Isolators for Fiber-Optic Communications", *IEEE Journal of Quantum Electronics*, vol. QE-16, No. 1, Jan. 1980, pp. 11–22.

*Primary Examiner*—William H. Punter
*Attorney, Agent, or Firm*—Hill, Van Santen, Steadman & Simpson

[57] ABSTRACT

An optical isolator for glass fiber communication technology, which avoids disruptive back reflections at the input side polarizer that faces a laser diode, consists of a dielectric alternating layer system that is glued between a pair of prisms. In order to obtain a reflection-free polarizer for linear polarized radiation arriving at a specific angle of incidence, the material of the prisms and layers are selected so that the index of refraction of the prisms is equal to the index of refraction of the layers having a low index of refraction and the angle of incidence of radiation at the radiation entrance surface as well as the angle of emergence at the radiation exit surface of the prism are selected to equal the Brewster angle which is given by the arc tan $(n_L/n_O)$ wherein $n_L$ is the low index of refraction of the layer and prisms and $n_O$ is the index of refraction of the medium adjacent to the prisms exit and entrance surfaces.

11 Claims, 3 Drawing Figures

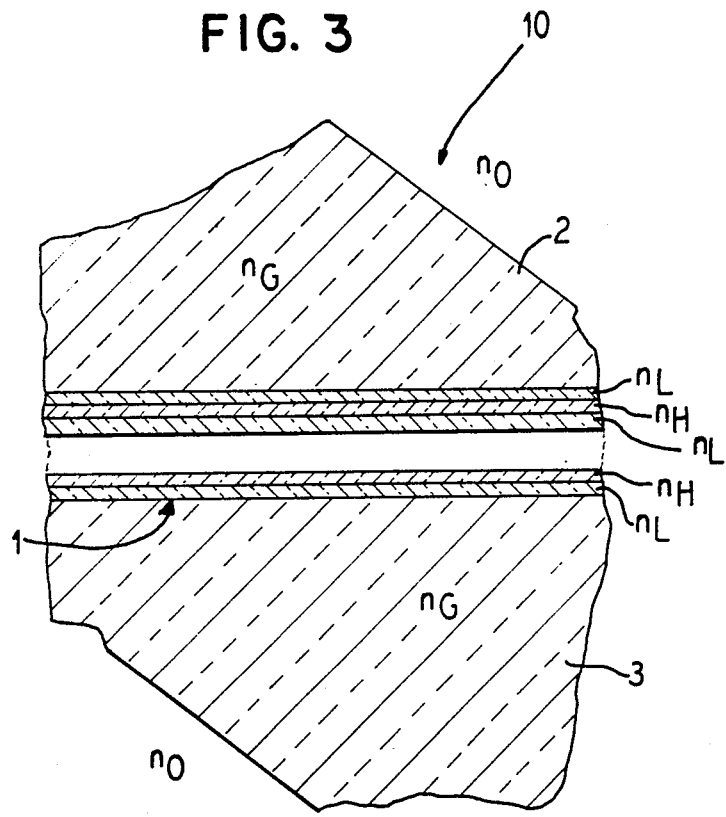

OPTICAL POLARIZER HAVING A DIELECTRIC MULTIPLE LAYER SYSTEM

BACKGROUND OF THE INVENTION

The present invention is directed to an optical polarizer comprising a dielectric multiple layer system which is composed of a plurality of layers having a low index of refraction alternately arranged with layers having a high index of refraction, and a pair of transparent bodies arranged on the surfaces of the dielectric multiple layer. One of the transparent bodies has a radiation entrance surface which is engaged with a medium of relatively low index of refraction for receiving incident radiation and the other of the pair of bodies has an exit surface engaged with a medium with a relatively low index of refraction for emitting radiation from the polarizer. The index of refraction of the transparent bodies, the high index of refraction layers and the low index of refraction layers are selected in such a manner that the Brewster condition is respectively met at the boundary surfaces between the layers and also between the layer system and each transparent body and also between each transparent body and the surrounding outside medium.

A polarizer, which is composed of a dielectric layer system or arrangement that has a plurality of layers and is disposed between a pair of transparent bodies such as prisms, is known as a polarizing beam divider and is disclosed in an article by Mahlein et al, *Optik*, Vol. 38, No. 2, 1973, pages 187–195. This device is employed as a continuously adjustable laser beam attenuator. Such a polarization beam divider is a polarization beam divider of the MacNeille type which is known and disclosed in U.S. Pat. No. 2,403,731; an article by Banning, "Practical Methods of Making and Using Multilayer Filters", *Journal of the Optical Society of America*, Vol. 37, No. 10, October 1947, pages 792–797 and by H. A. Macleod, *Thin-Film Optical Filters*, Adam Hilger Ltd., London, 1969, page 301.

A polarization beam divider such as disclosed in the article from *Optik* is constructed in such a manner that an alternating layer system consisting of an uneven number of m layers which alternately consist of layers having a high index of refraction $n_H$ and layers having a lower index of refraction $n_L$ in an alternate arrangement are positioned between two hypotenuse surfaces of two 90° prisms which exhibit a refractive index of $n_G$. An adhesive layer between the hypotenuse surface and the layer system should also exhibit the index of refraction $n_G$. The index of refractions $n_G$, $n_H$ and $n_L$ are selected in such a manner that the Brewster condition is respectively met at the boundary surfaces between the layers. Thus, a reflective power $R_s$ for radiation polarized perpendicular relative to the plane of incidence achieves a high value whereas the radiation which is polarized parallel to the plane of incidence is only weakly reflected.

In glass fiber communication technology, optical isolators, i.e., non-reciprocal optical components, are required when the optical power flux which is running backwards in the system and is caused by reflections at, for example, inhomogeneities such as joints, for example, in plugs or at splice locations, is disruptive. This is the case, for example, given laser diodes. Instabilities, which lead to increased noise and a change of the spectral emissions, occur in the laser emissions as a result of the disruptive feedback.

The optical isolators generally consist of a Faraday rotator, which is disposed between two polarizers crossed at 45° to each other. Such an isolator is disclosed in an article by K. Kobayashi et al, "Microoptic Grating Multiplexers and Optical Isolators for Fiber-Optic Communications", *IEEE Journal of Quantum Electronics*, Vol. QE-16, No. 1, January 1980, pages 11–22. In the practical realization of such isolators, a problem is the back reflection at the input side of the polarizer which side faces the transmitter. Even the provision of good anti-blooming layers on the polarizer surface will not overcome this problem.

SUMMARY OF THE INVENTION

The object of the present invention comprises creating a polarizer, which is reflection-free from linear polarized radiation messages emitter, for example, by a laser diode. This object is achieved by an improvement in a polarizer comprising a dielectric multiple layer system being composed of a plurality of layers having a low index of refraction alternately arranged with layers having a high index of refraction, said dielectric multiple layer system being disposed between a pair of transparent bodies with one of said pair of transparent bodies having a radiation entrance surface engaged with a medium of relatively low index of refraction for receiving incident radiation and the other of said pair of bodies having a radiation exit surface engaged with a medium with a relatively low index of refraction for emitting radiation from the polarizer wherein the index of refraction of the transparent bodies, the high index of refraction layers and low index of refraction layers are selected in such a manner that the Brewster condition is respectively met at the boundary surfaces between the layers and also between the layer system and each transparent body and also between each transparent body and the surrounding outside medium. The improvement comprises the index of refraction $n_G$ of each of the transparent bodies adjacent to the mutliple layer system being selected to be equal to the index of refraction $n_L$ of the layers having the low index of refraction, and both the angle of incidence of the radiation at the radiation entrance surface as well as at the angle of emergence of the radiation at the radiation exit surface being selected to equal the Brewster angle which is respectively given by arc tan $(n_L/n_0)$, wherein $n_0$ is the low index of refraction of the medium adjacent each of the radiation entrance and exit surfaces.

Preferably, both the angle which the radiation entrance surface describes with one side of the multiple layer or multilayer system as well as the angle which the radiation exit surface forms with a side of the multilayer system is selected equal to one of the following two relationships arc tan $(n_H/n_L)+$arc tan $(n_0/n_L)$ and arc tan $(n_H/n_L)-$arc tan $(n_0/n_L)$, wherein $n_H$ is the index of refraction of the layers of high index of refraction of the dielectric multiple layer system. In addition, the layer thickness $t_H$ of the layers having the high index of refraction are selected to be $$t_H = \frac{\lambda_0}{4} \frac{\sqrt{n_H^2 + n_L^2}}{n_H^2}$$

and the layer thickness $t_L$ of the layers having the lower index of refraction is selected to be $$t_L = \frac{\lambda_0}{4} \frac{\sqrt{n_H^2 + n_L^2}}{n_L^2}$$

wherein $\lambda_0$ is the wavelength of the incident radiation. Preferably, each of the layers having the low index of refraction consist of $SiO_2$. The device preferably has at least thirteen layers in the multilayer system.

BRIEF DESCRIPTION OF THE DRAWINGS

FIG. 3 is an enlarged, partial cross-sectional view of the multilayer system of the present invention.

DESCRIPTION OF THE PREFERRED EMBODIMENTS

Figure 1:
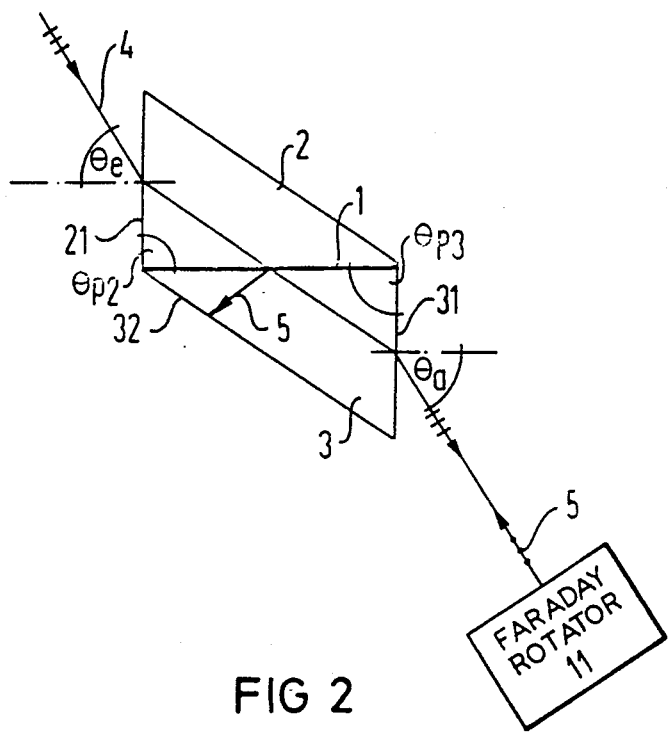
FIG. 1 is a schematic view of one embodiment of the reflection-free polarizer for an optical isolator in accordance with the present invention.
Figure 2:
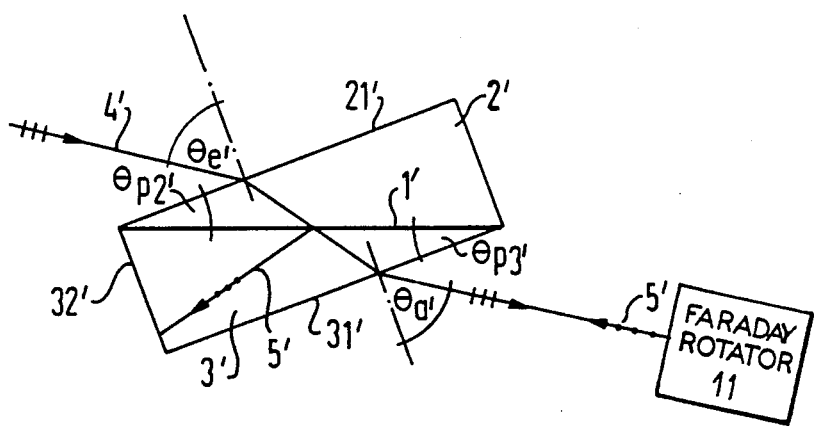
FIG. 2 is a second embodiment of the reflection-free polarizer for an optical isolator.

The principles of the present invention are particularly useful in the device generally indicated at 10 in FIG. 1 and 10' in FIG. 2.

On the basis of polarization beam dividers proceeding from the article in *Optik*, and briefly described hereinabove, various components of the residual reflecting power $R_p$ is first analyzed for radiation polarized parallel to the plane of incidence and it is then shown how the desired value $R_p=0$ can be achieved. Thus, it shows how the disruptive feedback of the polarizer on the beam transmitter is avoided. In the article by Kobayashi et al, it is assumed that the radiation strikes the polarizer with parallel ray bundles.

The undesired reflecting power $R_p$ is composed of four components. These are:

(1) reflection at the beam entry surface of the one prism which is a boundary surface of air/glass;

(2) reflection at the boundary surface between the prism and the multiple layer system;

(3) reflection at the boundary surface between the last layer of the multiple layer system and the other prism; and (4) reflection at the beam exit surface of the other prism which represents a glass/air boundary surface. Whereas, the components (1) and (4) are independent of the wavelength, the components (2) and (3) interfere and thus depend on the wavelength. In the wave number scale, one obtains a strictly periodical progression for the components (2) and (3) as pointed out in the article in *Optik*. It should be also noted that the interference of the components (2) and (3) hereinabove, are known and discussed in greater detail in the above-mentioned article from *Optik*.

In order to achieve a desired value $R_p=0$, the following measures are required:

(a) The index of refraction $n_G$ of the glass prism is selected equal to the index of refraction $n_L$ of the layers L having a lower index of refraction and thus $n_G=n_L$. In this case, the Brewster condition is always met at the boundary surface between the glass prism and the first or respectively last layer of the multilayer system whereas the destructive components (2) and (3) become zero.

(b) The second measure is that both the angle of incidence of radiation at the radiation entrance surface as well as the angle of emergence at the radiation exit surface are selected equal to the Brewster angle which is given by arc tan $(n_L/n_0)$, wherein $n_0$ denotes the index of refraction of the medium adjacent the radiation entrance surface and, the radiation exit surface and is usually air. Thus, the disruptive components (1) and (4) are also eliminated and there follows $R_p=0$. For a prism angle of $\theta_P$, which the radiation entrance surface or, respectively, the radiation exit surface forms with the hypotenuse surface proceeding parallel to the layers of the multiple layer system, two solutions occur from the above-mentioned members (a) and (b). The first solution is $\theta_P=$ arc tan $(n_H/n_L)+$arc tan $(n_0/n_L)$ and the second solution is $\theta_P=$ arc tan $(n_H/n_L)-$arc tan $(n_0/n_L)$.

The layer thickness $t_H$ of the layers having the high index of refraction which are the H layer and the layer thickness $t_L$ of the layers L having the low index of refraction are selected in such manner that their effective optical layer thickness are equal to one-fourth of the radiation wavelength of $\lambda_0$ which is a wavelength of the incident radiation. In combination with the Brewster condition for the boundary surfaces between the high index of refraction layers H and the low index of refraction layers L, there follows from the article in *Optik* that $$t_H = \frac{\lambda_0}{4} \frac{\sqrt{n_H^2 + n_L^2}}{n_H^2}, \; t_L = \frac{\lambda_0}{4} \frac{\sqrt{n_H^2 + n_L^2}}{n_L^2}$$

The peak reflecting power $R_s$ for the s-component increases with an increasing plurality of m layers and follows from H. A. Macleod, *Thin Film Optical Filters*, page 301, according to the equation (m=number of layers):

$$R_s = \left[ \frac{n_G^2 \cos^2\theta_G - n_H^2 \cos^2\theta_H (n_H/n_L)^{2(m-1)}}{n_G^2 \cos^2\theta_G + n_H^2 \cos^2\theta_H (n_H/n_L)^{2(m-1)}} \right]^2$$

From the above equations, under the condition of $n_G=n_L$ is then $$R_s = \left[ \frac{1 - (n_H/n_L)^{2(m+1)}}{1 + (n_H/n_L)^{2(m+1)}} \right]^2$$

Valid for the stop band width of the s-component in the standardized wave number scale $g=\lambda_0/\lambda$ is the equation specified in $$2\Delta g = \frac{4}{\pi} \arcsin \frac{(n_H/n_L)^2 - 1}{(n_H/n_L)^2 + 1}$$

Two examples of non-feedback polarizers are the polarizer 10 in FIG. 1 and the polarizer 10' in FIG. 2. The polarizer 10 corresponds to the first-mentioned solution whereas the polarizer 10' is illustrated in FIG. 2 and corresponds to the second above-mentioned solution.

As illustrated in FIG. 1, the polarizer 10 has a thin multilayer system 1, which is sandwiched between a pair of transparent bodies such as glass prisms 2 and 3 with the prism 2 having an entrance surface 21 and the prism 3 having an exit surface 31. In a similar manner, the polarizer 10' of FIG. 2 has a multilayer system 1' which is sandwiched between a pair of transparent prisms 2' and 3'. The prism 2' has an entrance surface 21' while the prism 3' has an exit surface 31'. It should be noted that in FIGS. 1 and 2, both of the thin multilayer systems 1 and 1' are only illustrated as a line separating the respective glass prisms. In reality, the multilayer system consists of a plurality of layers comprising $SiO_2$ and $TiO_2$ layers, which are alternately arranged with a layer of one type separating two adjacent layers of the other type (see FIG. 3).

The $SiO_2$ layer is a layer having a low index of refraction $n_L = 1.5$. The $TiO_2$ layer is a layer having a high index of refraction $n_H = 2.1$. Since the index of refraction $n_G$ of the prism material must be equal to the index of refraction $n_L$ of the layers having the low index of refraction, the prisms 2 and 3 of the polarizer 10, as well as the prisms 2' and 3' of the polarizer 10' and thus the optical adhesive used for gluing these prisms onto the respective layer systems must have an index of refraction $n_G = 1.5$.

Given these values for the index of refraction, the angle $\theta_{P2}$ derive from the first solution between the beam entrance surface 21 of the prism 2 and the one side of the multiple layer system 1 is $\theta_{P2} = 88.15°$. Accordingly, the angle $\theta_{P3}$ which is between the radiation exit surface 31 of the other prism 3 and the other side of the multilayer system 1 is equal to 88.15°.

The angle $\theta_{P2'}$ between the radiation entrance surface 21' of the prism 2' and the one side of the multilayer system 1' is derived from the second solution and is $\theta_{P2'} = 20.77°$. Accordingly, the angle $\theta_{P3'}$, which is between the radiation exit surface 31' of the other prism 3' and the other side of the multilayer system 1' is $\theta_{P3'} = 20.77°$.

The polarizers according to FIGS. 1 and 2 are illustrated in such a manner that the plane of incidence of the radiation is parallel to the plane of the drawing. Each of the illustrated polarizers is reflection-free for a light beam 4 or 4' (FIG. 2), linearly polarized to be parallel to the plane of incidence and thus to the plane of the drawing when the beam strikes the radiation entrance surfaces 21 or 21' at an angle of incidence $\theta_e$ or $\theta_{e'}$ of 56.31° measured relative to a normal of the entrance surface. The beam emerges from the radiation surface 31 or 31' at an angle $\theta_a$ or, respectively, $\theta_{a'}$, measured relative to the normal of the exit surface which angle also amounts to 56.31°.

The beam, which has emerged from the light exit surface 31 or 31', respectively, is supplied to a Faraday rotator 11. Each of the layers 1 and 1' will also reflect a beam 5 or 5' which are returned from a Faraday rotator 11. Expediently, the prism 3 has a surface 32 and the prism 3' has a surface 32' which is lacquered black or provided with a light absorber to absorb the beams 5 and 5', respectively. In addition, these lateral surfaces may be below the Brewster angle to allow such a beam to emerge from the prism.

The following table shows a dependency of the peak reflecting power or maximum reflecting power $R_s$ as a function of the plurality of m layers:

| m | $R_s$ |
|---|---|
| 1 | 0.3445 |
| 3 | 0.7623 |
| 5 | 0.9319 |
| 7 | 0.9818 |
| 9 | 0.9952 |
| 11 | 0.9988 |
| 13 | 0.9997 |
| 15 | 0.9999 |
| 17 | 1.0000 |

It proceeds from this table that the layer system having $m = 13$ layers suffices.

In practice, a multilayer system achieves a maximum reflecting power of $R_s \geq 0.998$. This, however, does not mean that the transmissive power $T_s$ exhibits a value of $1 - 0.998 = 0.002$. In reality, the transmission power is far less than 0.002 since to a greatly predominant part the 0.002 is made up of scatter and absorption components. Since the scatter largely occurs isotropically, its feedback on the transmitter, for example, a laser diode, is negligible. From the last above-mentioned equation for the stop band width, a stop band width of approximately 300 nm will occur for a wavelength $\lambda_0 = 800$ nm. Therefore, fluctuations of the laser wavelength $\lambda_0$ do not negatively influence the manner of functioning of the polarizer.

Although various minor modifications may be suggested by those versed in the art, it should be understood that I wish to embody within the scope of the patent granted hereon, all such modifications as reasonably and properly come within the scope of my contribution to the art.

I claim:

1. In an optical polarizer comprising a dielectric multiple layer system being composed of a plurality of layers having a low index of refraction alternately arranged with layers having a high index of refraction, said dielectric multiply layer system being disposed between a pair of transparent bodies with one of said pair of transparent bodies having a radiation entrance surface engaged with a medium of relatively lower index of refraction for receiving incident linearly polarized radiation from a source and the other of said pair of bodies having a radiation exit surface engaged with a medium with a relatively low index of refraction for emitting linearly polarized radiation of a first direction from the polarizer to a Faraday rotator, said Faraday rotator returning radiation back to the exit surface with a second direction of polarization perpendicular to the first direction, wherein the index of refraction of the transparent bodies, the high index of refraction layers and the lower index of refraction layers are selected in such a manner that the Brewster condition is respectively met at the boundary surfaces between the layers and also between the layer system and each transparent body and also between each transparent body and the surrounding outside medium, the improvements comprising the index of refraction $n_G$ of each of the transparent bodies adjacent to the multiple layer system being selected to be equal to the index of refraction $n_L$ of the layers having the lower index of refraction, and both the angle of incidence of the radiation at the radiation entrance surface as well as the angle of emergence of the radiation at the radiation exit surface being selected to equal the Brewster angle which is respectively given by arc tan $(n_L/n_0)$, wherein $n_0$ is the low index of refraction of the medium adjacent each of the radiation entrance and exit surfaces and said muliple layer system reflecting the light with the second direction of polarization from the Faraday rotator.

2. In an optical polarizer according to claim 1, wherein the multilayer system consists of at least thirteen layers.

3. In an optical polarizer according to claim 1, wherein the layers having a low index of refraction of the multilayer system consist of $SiO_2$ and the layers with a high index of refraction consist of $TiO_2$.

4. In an optical polarizer according to claim 3, wherein the multilayer system consists of at least thirteen layers.

5. In an optical polarizer according to claim 1, wherein the layer thickness $t_H$ of the layers having a high index of refraction ($n_H$) are selected to equal $$t_H = \frac{\lambda_0}{4} \frac{\sqrt{n_H^2 + n_L^2}}{n_H^2}$$

and the layer thickness $t_L$ of the layers having the low index of refraction are equal to $$t_L = \frac{\lambda_0}{4} \frac{\sqrt{n_H^2 + n_L^2}}{n_L^2}$$

wherein $\lambda_0$ is the wavelength of the incident radiation.

6. In an optical polarizer according to claim 5, wherein the layers having a low index of refraction consist of $SiO_2$ and the layers having a high index of refraction consist of $TiO_2$.

7. In an optical polarizer according to claim 6, wherein the multilayer system consists of at least thirteen layers.

8. In an optical polarizer according to claim 1, wherein the angle between the radiation entrance surface of the transparent body and the layers of the multilayer system and the angle between the radiation exit surface and the layers of the multilayer system are selected according to one of the following two relationships, arc tan $(n_H/n_L)$+arc tan $(n_0/n_L)$ and arc tan $(n_H/n_L)$−arc tan $(n_0/n_L)$, wherein $n_H$ comprises the index of refraction of the layers having a high index of refraction of the dielectric multiple layer system.

9. In an optical polarizer according to claim 8, wherein the layer thickness $t_H$ of the layers with a high index of refraction is selected according to the equation $$t_H = \frac{\lambda_0}{4} \frac{\sqrt{n_H^2 + n_L^2}}{n_H^2}$$

the layer thickness of the $t_L$ of the layers of low index of refraction selected according to the equation $$t_L = \frac{\lambda_0}{4} \frac{\sqrt{n_H^2 + n_L^2}}{n_L^2}$$

wherein $\lambda_0$ is the wavelength of the incident radiation.

10. In an optical polarizer according to claim 8, wherein the layers having the low index of refraction consist of $SiO_2$ and the layers having the high index of refraction consist of $TiO_2$.

11. In an optical polarizer according to claim 10, wherein the multilayer system consists of at least thirteen layers.

* * * * *